United States Patent [19]

Zubiate et al.

[11] 4,305,976

[45] Dec. 15, 1981

[54] FIRE RETARDANT PROCESS

[76] Inventors: Robert G. Zubiate, 4215 Chamoune, San Diego, Calif. 92115; Jaime Schliapnik, 4145 Highland #3, San Diego, Calif. 92105

[21] Appl. No.: 149,184

[22] Filed: May 12, 1980

[51] Int. Cl.³ ............................................. B05D 1/12
[52] U.S. Cl. ............................... 427/180; 106/18.11; 106/18.16; 252/607; 427/325; 427/369; 427/421; 427/427; 427/440; 427/441
[58] Field of Search ............... 427/325, 369, 421, 427, 427/440, 441, 180; 252/8.1; 106/18.11, 18.16

[56] References Cited

U.S. PATENT DOCUMENTS

| | | | |
|---|---|---|---|
| 174,914 | 3/1876 | Lockwood | 427/440 |
| 646,101 | 3/1900 | Simpson | 427/440 |
| 1,157,205 | 8/1915 | Loud | 427/441 |
| 1,732,420 | 10/1929 | Rice | 427/325 |
| 2,381,049 | 8/1940 | Hammond | 427/440 |
| 4,051,282 | 9/1977 | Davies | 427/441 |
| 4,142,009 | 2/1979 | Kyle | 427/441 |
| 4,212,675 | 7/1980 | Robinson | 106/18.16 |
| 4,223,066 | 9/1980 | Boyle | 427/180 |

*Primary Examiner*—Michael R. Lusignan
*Assistant Examiner*—Janyce A. Bell
*Attorney, Agent, or Firm*—Ralph S. Branscomb

[57] ABSTRACT

A method is provided which permanently embeds a fire retardant such as diammonium phsophate into wood shingles, wood framing members or other wood members by means of blasting a special slurry of the fire retardant into the body of the wood with an airless spray gun, or alternatively soaking or dipping the wood in a softening solution and then emersing it in the fire retardant slurry which is subsequently pressurized to over 100 pounds per square inch, in either case the diammonium phosphate granules being embedded into the wood where they are protected from being leached at by rainfall and the like by a nonsoluable, nonvolatile carrier liquid.

6 Claims, No Drawings

FIRE RETARDANT PROCESS

BACKGROUND OF THE INVENTION

A sampling of the prior art relating to fire retardant mixtures, particularly those used for fire protection for clothing and textiles but also including wood treatments, is found in the following U.S. Pat. Nos. 2,262,634; 2,305,035; 2,339,277; 2,482,755; 2,692,203; 2,917,408; 3,035,053; 3,085,029; 3,100,790.

The art is directed toward chemical combinations, and in some instances processes, for creating non-leaching flame retardants both for textiles and wood. For wood, multiple step processes are used such as is evidenced in U.S. Pat. No. 2,197,408, involving the high temperature treatment of the wood in a solution for a period of time.

In practice, a fire ratardant such as diammonium phosphate is sometimes merely mixed with water and sprayed on the wood which is effective until, throughout a season of periodic rains, the fire retardant is leached from the wood, and the wood is as susceptible to flames as it was prior to treatment.

SUMMARY OF THE INVENTION

The present invention provides a method which in its one implementation is simple to apply directly to in-position timbers and roof shingles, and in another implementation deeply embeds the fire retardant particles and a protective carrier into the wood. In both instances the fire retardant used is diammonium phosphate, and in its on-site implementation the diammonium phosphate is combined in a mixture of linseed oil, which protects the fire retardant from leaching for life, and industrial antifreeze which is currently sometimes used to soften wood for sawing and prevent it from splintering or crumbling. The industrial antifreeze acts as a thinner and wood conditioner and dissipates over time leaving the linseed oil residue and the particulate diammonium phosphate.

The above-mentioned three-part mixture is blown into the wood with an airless spray gun so that the small, coated granules of diammonium phosphate are actually blasted into the wood grain beneath the surface. This deep-embedding technique, coupled with the coating of linseed oil, successfully prevents the leaching of the fire retardant and thus preserves the wood in fire retarded condition indefinitely.

In the event the wood is treated prior to its installation in a building, a modification of the process involves soaking or dipping the members to be treated in a vat of industrial antifreeze to soften and condition the wood exterior. The wood is then removed and placed in a pressurized vat containing the diammonium phosphate granules combined as a slurry in linseed oil, or a mixture of linseed oil and industrial antifreeze. The pressure in the vat is subsequently raised to over 100 pounds per square inch, causing the granules together with the solution to be imbedded deeply into the wood as the air which naturally permeates the wood structure is compressed due to the compression.

DETAILED DESCRIPTION OF THE PREFERRED EMBODIMENT

Inventors of the instant method have worked for some time to develop a process, and a suitable combination of ingredients, that would simply and effectively impregnate wood with a fire retardant and resist leaching from rain. The experiments were initially begun with a combination of diammonium phosphate and water as the two basic ingredients. In general it was found that if the mixture contained less than 20% diammonium phosphate it was simply inadequate to protect the wood; 30% was fairly effective, and 35% provided an added safety factor. In these experiments, the carrier comprising the balance of the solution was principally water with the result that although initially the wood may have been protected, in short time the fire retardant would have been leached away leaving the wood unprotected.

Further experiments were conducted combining into the mixture up to 50% silicone SWS 101 and in some instances glycerin was also incorporated. Neither of these ingredients adequately preserved the diammonium phosphate. Linseed oil was then as the basic carrier liquid for the diammonium phosphate slurry and it was found to be effective as a prophylactic against leaching, albeit somewhat thick for use in the spray technique.

By the addition of industrial antifreeze, a known wood softener and solvent, a seemingly ideal mixture was prepared which was of the proper consistency to apply, which contained adequate diammonium phosphate to effectively retard flame spreading, and by virtue of the incorporation of the linseed oil primary carrier formed a residue interiorly of the wood surface which effectively prevented leaching.

The combination of these ingredients which best achieves these results is, by weight:

58% linseed oil, 34% diammonium phosphate and 8% industrial antifreeze. The ingredients in the order listed are thus in about the following proportions: 7:4:1.

As mentioned in the Summary there are two principal ways that these ingredients are caused to embed themselves into the wood grain rather than being merely a superficial coating. The first, which is extremely convenient for buildings which have already been constructed and especially on shake shingles which pose a primary threat in arid, fire prone areas, is to mix the ingredients in the proportions stated and apply them directly to the wood through an airless gun. These guns are capable of propelling liquids at a rather high velocity, and are used in many industrial applications. Another application is the inocculation gun which drives a column of liquid at speeds adequate to penetrate the skin just as would a solid hypodermic needle.

In the event the airless gun is used, it is conceivable that the wood could be pre-dipped in industrial antifreeze to soften it and render it more accepting of the high-velocity mixture, although this is not necessary for the effective application of the mixture. In the secondary process such as soaking, or at least dipping of the wood in industrial antifreeze is effective in softening the wood surface. When the wood is subsequently immersed in a diammonium phosphate particulate slurry in linseed oil, and then pressurized, the mixture penetrates deep into the surface of the wood, partially by virtue of the softening achieved by the industrial antifreeze. This technique obviously is more effective for timbers which have not yet been incorporated in the building as there are no shadows or protected spots and the solution penetrates the surface evenly. However, it is not nearly as simple and is of course inapplicable to buildings already erected.

In either of its implementations, the method shown here in its two embodiments effectively impregnates and seals the wood indefinitely. In addition to augmenting the wood's fire retardant properties, particularly because of the incorporation of linseed oil, the solution acts as a protective coating against weather and the elements. As a result possibly shake shingle roofs treated with the mixture possibly could go longer between coatings of oil without cracking.

Additionally, a small quantity of compatible insecticide combined with the mixture, especially when treating timbers prior to their installation, would resist the infestation of termites as well as the threat of fire.

What is claimed is:

1. A method of treating wood with fire retardant comprising blasting into the wood surface, by use of an airless compressor/sprayer, a mixture of fine particulate fire retardant and a carrier liquid.

2. A method according to claim 1 wherein said particulate fire retardant comprises diammonium phosphate and said carrier liquid is linseed oil.

3. A method according to claim 1 and including the prior step of dipping the wood into a softening agent.

4. A method according to claim 3 wherein said softening agent is industrial antifreeze.

5. A method according to claim 1 wherein said carrier liquid includes industrial linseed oil and industrial antifreeze.

6. A method according to claim 5 wherein the ingredients are combined substantially in the following proportions: 4 parts diammonium phosphate; 7 parts linseed oil; 1 part industrial antifreeze.

* * * * *